3,825,579
N-PHENYLTHIOCARBAMOYLTHIO-
HYDROXIMATE PESTICIDES
Keimei Fujimoto, Kobe, Masachika Hirano, Mino, and Hisami Takeda and Shigehiro Ooba, Takarazuka, Japan, assignors to Sumitomo Chemical Company, Limited, Osaka, Japan
No Drawing. Filed Sept. 21, 1971, Ser. No. 182,537
Claims priority, application Japan, Sept. 24, 1970, 45/84,376
Int. Cl. C07c 119/00
U.S. Cl. 260—453 R     7 Claims

ABSTRACT OF THE DISCLOSURE

A carbamate compound of the formula:

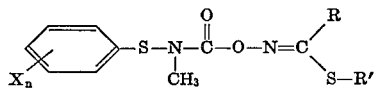

wherein X is hydrogen, lower alkyl, lower alkoxy, nitro or halogen, R and R' are each lower alkyl and $n$ is an integer of 1 to 5, which is useful as an insecticide, a nematocide and an acaricide with less toxicity to warm-blooded animals and can be prepared by reacting a benzenesulfenyl halide of the formula:

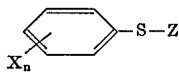

wherein X and $n$ are each as defined above and Z is halogen with an N-methylcarbamic ester of the formula:

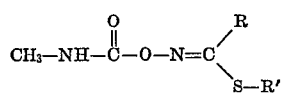

wherein R and R' are each as defined above in an inert solvent in the presence of a base at a temperature of —10 to 50° C.

The present invention relates to novel carbamate compounds, and their preparation an duse. More particularly, it relates to carbamate compounds of the formula:

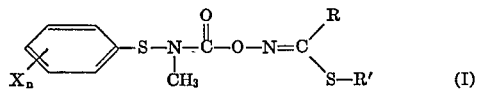

wherein X is hydrogen, lower alkyl (e.g. methyl, ethyl, propyl, isopropyl, butyl), lower alkoxy (e.g. methoxy, ethoxy, propoxy, isopropoxy, butoxy), nitro or halogen (e.g. chlorine, bromine, iodine, fluorine), R and R' are each lower alkyl (e.g. methyl, ethyl, propyl, isopropyl, butyl) and $n$ is an integer of 1 to 5, and their preparation and use.

In this specification, the term "lower" is intended to mean those having 1 to 4 carbon atoms.

As the results of the study on the pesticidal activity of various chemical compounds, it has been found that the said carbomate compounds (I) show an excellent insecticidal activity as well as a nematocidal activity and an acaricidal activity with less toxicity to warm-blooded animals. Thus, they are useful as pesticides against a wide variety of harmful organisms including insects, nematodes and mites.

According to the present invention, the cambamate compound (I) can be prepared by reacting a benzene-sulfenyl halide of the formula:

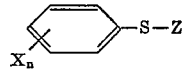

wherein X and $n$ are each as defined above and Z is halogen (e.g. chlorine, bromine) with an N-methylcarbamic ester of the formula:

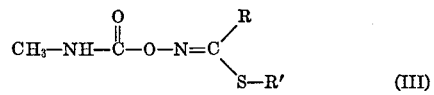

wherein R and R' are each as defined above.

Examples of the benzenesulfenyl halide (II) are as follows:

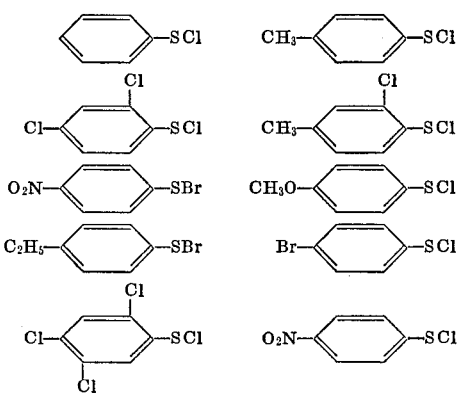

Examples of N-methylcarbamic ester (III) are as follows:

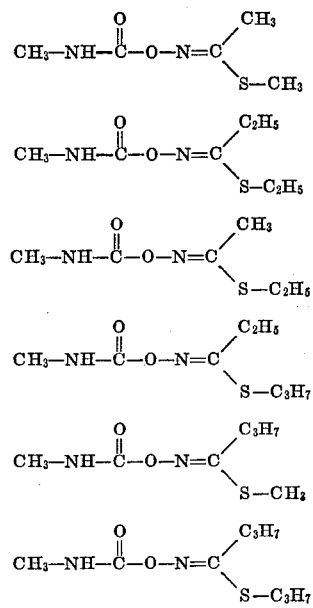

The reaction is usually effected in an inert solvent (e.g. benzene, toluene, xylene, ether, chloroform, carbon tetrachloride) in the presence of a base such as a tertiary organic amine (e.g. triethylamine, dimethylaniline, diethylaniline, pyridine, N-methylmorpholine) at a temperature from —10 to 50° C. The particularly preferred inert solvent and base are benzene and pyridine, respectively.

Typical examples of the carbamate compounds (I) prepared by the process of this invention are as follows:

| Compound No. | Structural formula |
| --- | --- |
| 1 | ⟨phenyl⟩—S—N(CH$_3$)—C(=O)—O—N=C(CH$_3$)(S—CH$_3$) |
| 2 | CH$_3$—⟨phenyl⟩—S—N(CH$_3$)—C(=O)—O—N=C(CH$_3$)(S—CH$_3$) |
| 3 | Cl—⟨phenyl(Cl)⟩—S—N(CH$_3$)—C(=O)—O—N=C(CH$_3$)(S—CH$_3$) |
| 4 | CH$_3$—⟨phenyl(Cl)⟩—S—N(CH$_3$)—C(=O)—O—N=C(CH$_3$)(S—CH$_3$) |
| 5 | O$_2$N—⟨phenyl⟩—S—N(CH$_3$)—C(=O)—O—N=C(CH$_3$)(S—CH$_3$) |

As stated above, the carbamate compounds (I) exhibit a strong insecticidal activity against various harmful insects, including those belonging to *Hemiptera, Lepidoptera, Coleoptera* and *Diptera,* as well as a nematocidal activity and an acaricidal activity against nematodes and mites. It is particularly notable that they exert their activities rapidly on *Hemiptera* insects (e.g. planthopper, leafhopper, aphid, bug) and larvae of midges which are carriers of various infectious diseases. Some of the test results, by which the favorable activities of the carbamate compounds (I) are evidenced, are shown below.

Test 1

A 500 fold dilution of a 40% emulsifiable concentrate of Compound No. 1 or 3 prepared as in Example I was applied to rice plants (15 to 20 cm. tall) 30 days after the emergence in pots by the use of a turn table at a rate of 10 ml. per pot. After the lapse of certain days, smaller brown planthoppers (*Laodelphax striatellus*) were released to the rice plants, and covered by a net cage. After 24 hours, the mortality was calculated to know the residual effect of the compounds. The results are shown in Table 1.

TABLE 1

| | Mortality (percent) after— | | | |
| --- | --- | --- | --- | --- |
| | 1 day | 4 days | 7 days | 11 days |
| Compound number: | | | | |
| 1 | 93.3 | 75.0 | 56.2 | 33.3 |
| 3 | 85.2 | 66.7 | 63.2 | 10.0 |

Test 2

A 5% dust of Compound No. 1 or 3 prepared as in Example III was applied to rice plants 40 days after the emergence in pots by the use of a duster at a rate of 3 kg. per 10 ares. 30 White-backed planthoppers (*Sogatella furcifera*) were released thereto and covered by a glass cylinder. The knock down percent with the lapse of time was calculated. The results are shown in Table 2.

TABLE 2

| | Knock down, percent | | | | | | KT$_{50}$ |
| --- | --- | --- | --- | --- | --- | --- | --- |
| Lapse of time (min.) | 5 | 10 | 20 | 40 | 60 | 100 | (min.) |
| Compound number: | | | | | | | |
| 1 | 10.0 | 13.3 | 20.0 | 23.3 | 33.3 | 50.0 | 100 |
| 3 | 6.7 | 16.7 | 30.0 | 40.0 | 46.7 | 60.0 | 70 |

Test 3

To the root of rice plants grown in pots and being at the tillering stage, 6% granules of Compound No. 1 or 3 prepared as in Example IV were applied at a rate of 6 kg./10 ares. After 3 days, 30 adults of green rice leafhoppers were released thereto and covered by a net cage. The mortality was calculated after 24 hours. The results are shown in Table 3.

TABLE 3

| Compound No.: | Mortality (percent) |
| --- | --- |
| 1 | 85.2 |
| 3 | 79.3 |

Test 4

In a beaker, 0.5 ml. of an aqueous dilution of a 40% emulsifiable concentrate of Compound No. 1, 3, 4 or 5 prepared as in Example I was admitted, and 0.5 ml. of water containing nematodes was added thereto. Adjusting the resultant mixture to make a designed concentration of the active compound, the death was observed microscopically 24 hours thereafter. The results are shown in Table 4.

TABLE 4

| | Concentration (p.p.m.) | Mortality (percent) |
| --- | --- | --- |
| Compound number: | | |
| 1 | 500 | 100 |
| 3 | 500 | 96.7 |
| 4 | 500 | 82.1 |
| 5 | 500 | 75.0 |
| O,O-diethyl O-(4-dimethylsulfamoyl)-phenylphosphorothioate | 500 | 83.3 |

Test 5

A 40% emulsifiable concentrate of Compound No. 1, 3 or 4 prepare as in Example I was diluted with water to make a designed concentration of the active ingredient, and 30 larvae of mosquito (*Culex pipiens pallens*) were released therein. After 24 hours, the mortality was recorded and the LC$_{50}$ was calculated. The results are shown in Table 5.

TABLE 5

| Compound No.: | LC$_{50}$ (p.p.m.) |
| --- | --- |
| 1 | 0.37 |
| 3 | 0.08 |
| 4 | 0.63 |

Further, the carbamate compounds (I) are quite less toxic to warm-blooded animals. For instance, in the oral administration of Compound Nos. 1 to 5 in aqueous suspension to male mice at a rate of 500 milligrams per kilogram of body weight, no death was observed after 48 hours.

As ensured by these and other test results, the carbamate compounds (I) are useful for combatting various injurious insects, nematodes and mites, particularly in agriculture and household, with high safety to warm-blooded animals.

For the insecticidal use, the carbamate compound (I) is normally extended with an inert carrier to make a preparation form conventionally employed for insecticides such as emulsifiable concentrate, wettable powder, oil spray, dust, granule, aerosol, bait or the like. Examples of the inert carrier are talc, clay, bentonite, kaolin, diatomaceous earth, pyrophyllite, benzene, toluene, dimethylnaphthalene, aromatic naphtha, etc. Surfactants may be also used as spreaders or emulsifiers. When desired, there may be further incorporated other insecticidal agents such as chlorinated hydrocarbons (e.g. DDT, methoxychlor, benzene hexachloride, chlordane, toxaphene, heptachlor, aldrin, endrin), organic phosphorus compounds (e.g. phenitrothion, Surecide, Cyanox, malathion, demeton, tetraethyl pyrophosphate, Salithion), carbamate compounds (e.g. Seven, 3,4-dimethylphenyl-N-methyl carbamate, Lannate) and pyrethroids (e.g. pyrethrin, allethrin, tetramethrin, 5-benzyl-furfuryl chrystanthemate, barthrin), miticides, nematocides, microbicides, herbicides, fertilizers, soil disinfectants and the like.

Practical embodiments of the present invention are illustratively shown in the following examples. In these examples, parts are by weight.

Example 1

In a 300 ml. volume four necked flask, S-methyl-O-(N-methylcarbamoyl)methylthiohydroximate (16.2 g.; 0.1 mol), pyridine (7.9 g.; 0.1 mol) and benzene (100 ml.) are charged, and benzenesulfenyl chloride (21 g.; 0.1 mol) is added thereto under cooling. The resultant mixture is stirred at room temperature for 3 hours. The reaction mixture is washed with water, and the benzene is removed by distillation under reduced pressure to give S-methyl-O-(N - methyl-N-phenylthiocarbamoyl)methylthiohydroximate (Compound No. 1) in 90% yield. $n_D^{30.5}$ 1.5863.

Example 2

In the same manner as above, the following compounds are prepared:

Example III

Compound No. 3 (5 parts) and talc (95 parts) are mixed thoroughly and pulverized to make 5% dust. The dust is applied as such.

Example IV

Compound No. 4 (6 parts), sodium ligninsulfonate (2 parts) and 200 mesh clay (92 parts) are mixed thoroughly in this order, kneaded with a small amount of water, granulated and then dried to make 6% granules. The granules are applied as such.

What is claimed is:

1. A carbamate compound of the formula

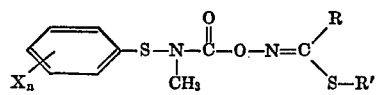

Example I

Compound No. 1 (40 parts), dimethylformamide (20 parts), cyclohexanone (20 parts) and a surfactant (trade name "Sorpol 9049" manufactured by Toho Chemical Co., Ltd., Japan; 20 parts) are mixed thoroughly in this order to make 40% emulsifiable concentrate. The emulsifiable concentrate is diluted with water and then applied.

Example II

Compound No. 2 (40 parts), silica (trade name "Tokusil GU-N" manufactured by Tokuyama Soda Co., Ltd., Japan; 10 parts), diatomaceous earth (trade name "Radiolite L"; manufactured by Showa Kagaku Co., Ltd., Japan; 45 parts) and a surfactant (trade name "Sorpol 5029" manufactured by Toho Chemicl Co., Ltd., Japan; 5 parts) are mixed thoroughly in this order to make 40% wettable powder. The wettable powder is diluted with water and then applied.

wherein X is hydrogen, lower alkyl, lower alkoxy, nitro, chlorine or bromine, R and R' are each lower alkyl and $n$ is an integer of 1 to 3.

2. The carbamate compound according to claim 1, wherein X is hydrogen, R and R' are each methyl and $n$ is 1.

3. The carbamate compound according to claim 1, wherein X is methyl, R and R' are each methyl and $n$ is 1.

4. The carbamate compound according to claim 1, wherein X is chlorine, R and R' are each methyl and $n$ is 2.

5. The carbamate compound according to claim 1, wherein one X is methyl and the other X is chlorine, R and R' are each methyl and $n$ is 2.

6. The carbamate compound according to claim 1, wherein X is nitro, R and R' are each methyl and $n$ is 1.

7. A carbamate compound of the formula:
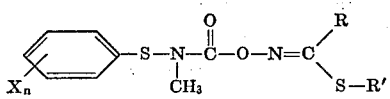
wherein X is hydrogen, lower alkyl, lower alkoxy, nitro chlorine, bromine or iodine, R and R' are each lower alkyl and $n$ is an integer of 1 to 3.
References Cited
UNITED STATES PATENTS
| 3,576,834 | 4/1971 | Buchanan | 260—566 AC |
| 3,506,698 | 4/1970 | Jelinek | 260—453 R |
| 3,663,594 | 5/1972 | Brown et al. | 71—98 |
| 3,646,062 | 2/1972 | Fridinger et al. | 260—566 AC |
GLENNON H. HOLLRAH, Primary Examiner
U.S. Cl. X.R.
424—298